Aug. 3, 1937.  R. P. ASH ET AL  2,088,563
STITCHING MACHINE
Filed June 26, 1936    8 Sheets-Sheet 2

Inventors
R. P. Ash
J. E. Patty
By C. A. Snow & Co.
Attorneys.

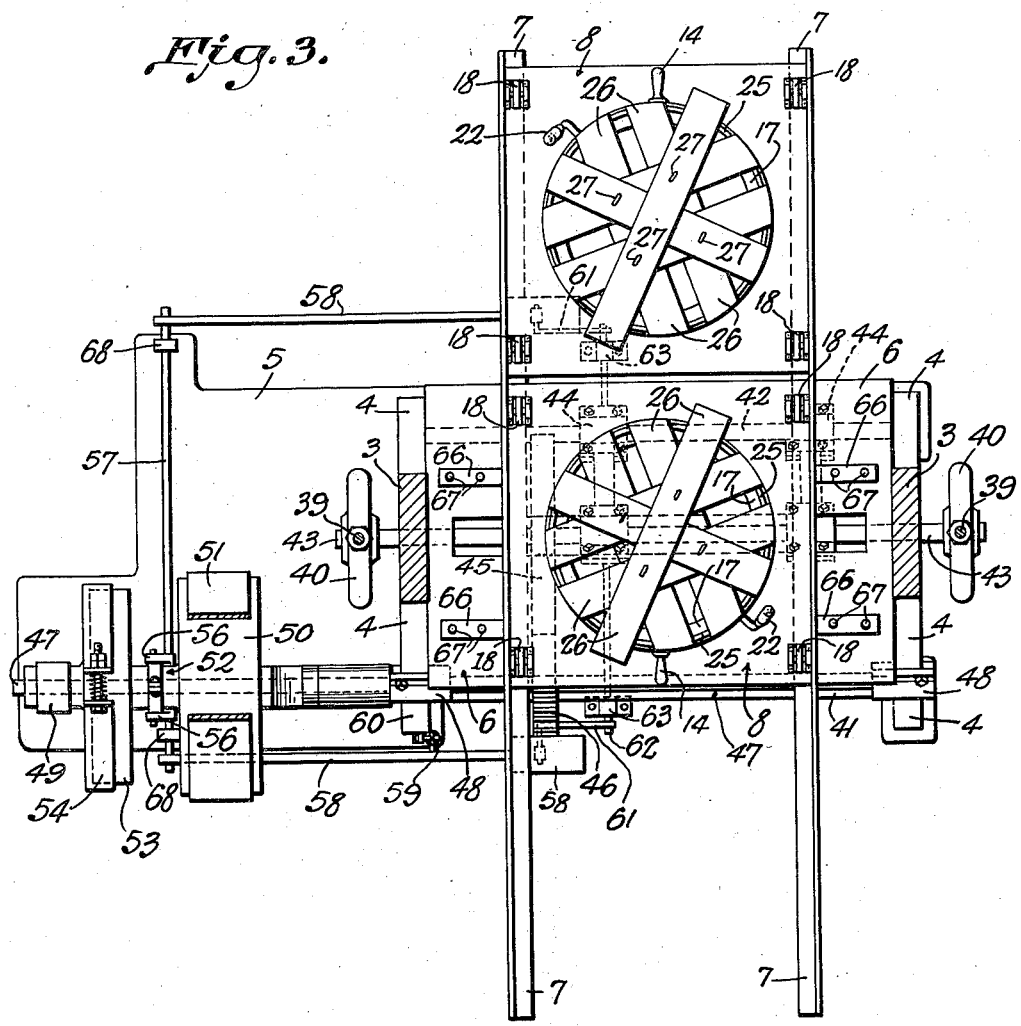

Aug. 3, 1937.  R. P. ASH ET AL  2,088,563
STITCHING MACHINE
Filed June 26, 1936  8 Sheets-Sheet 4
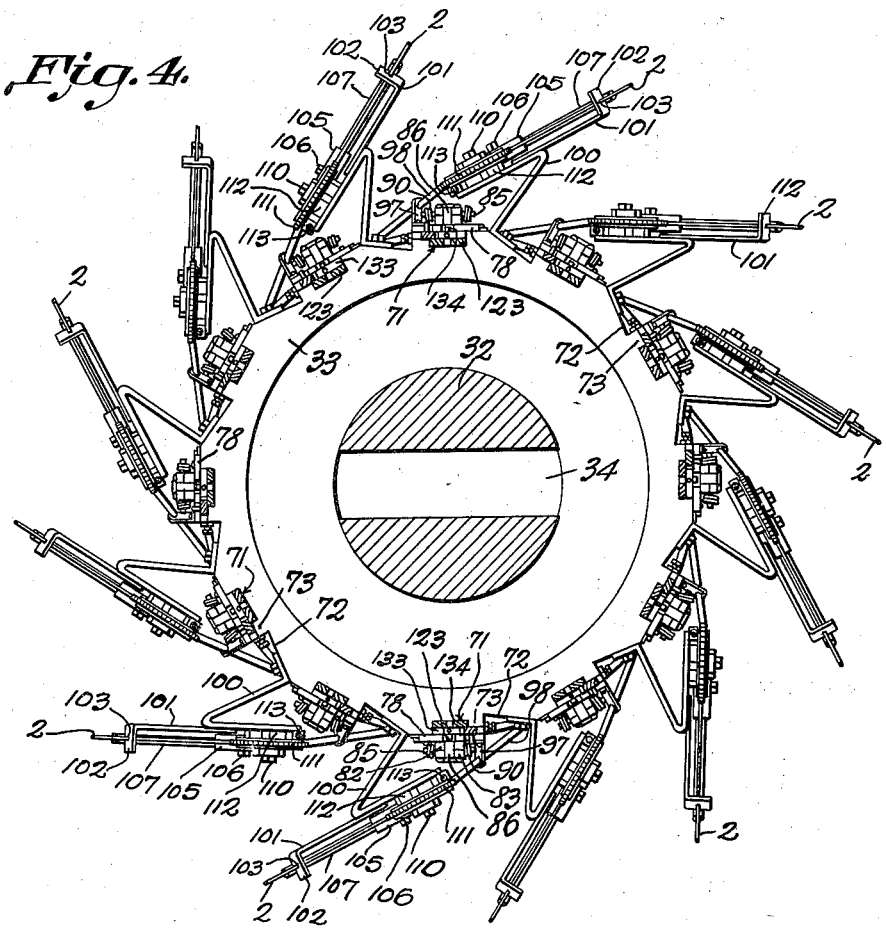
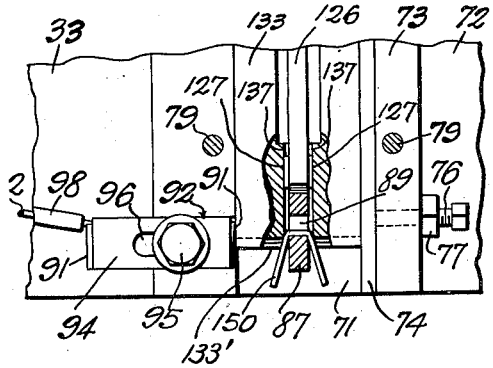
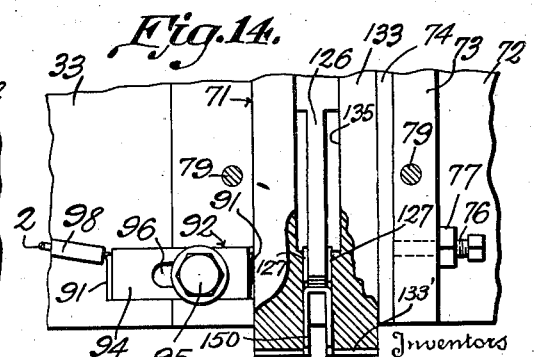
Inventors
R. P. Ash
J. E. Patty
By C. A. Snow & Co.
Attorneys.

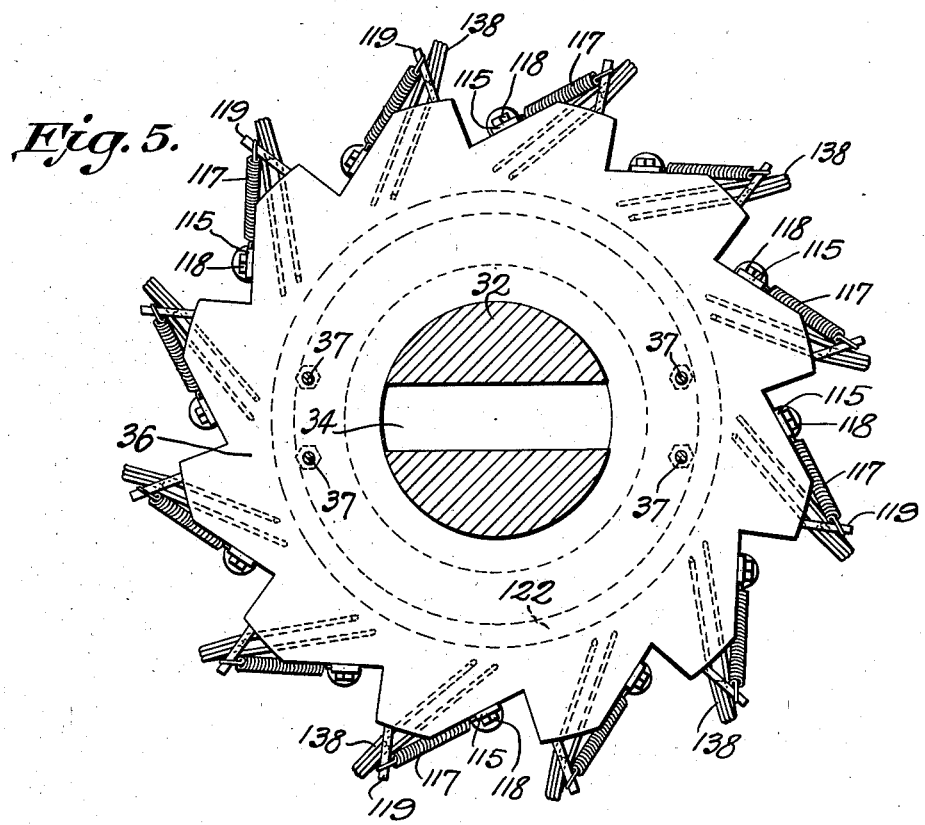
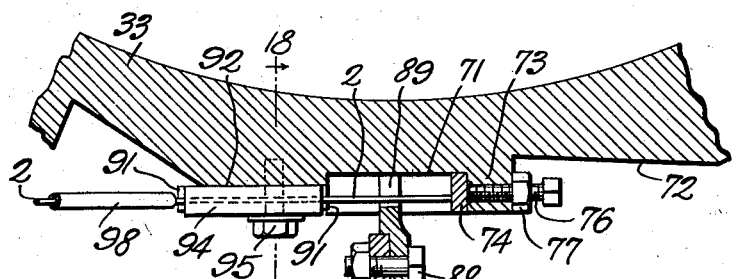
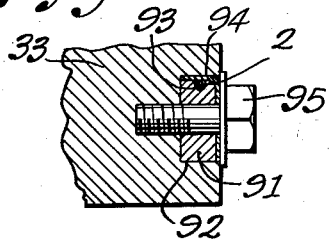

Aug. 3, 1937.  R. P. ASH ET AL  2,088,563
STITCHING MACHINE
Filed June 26, 1936  8 Sheets-Sheet 6
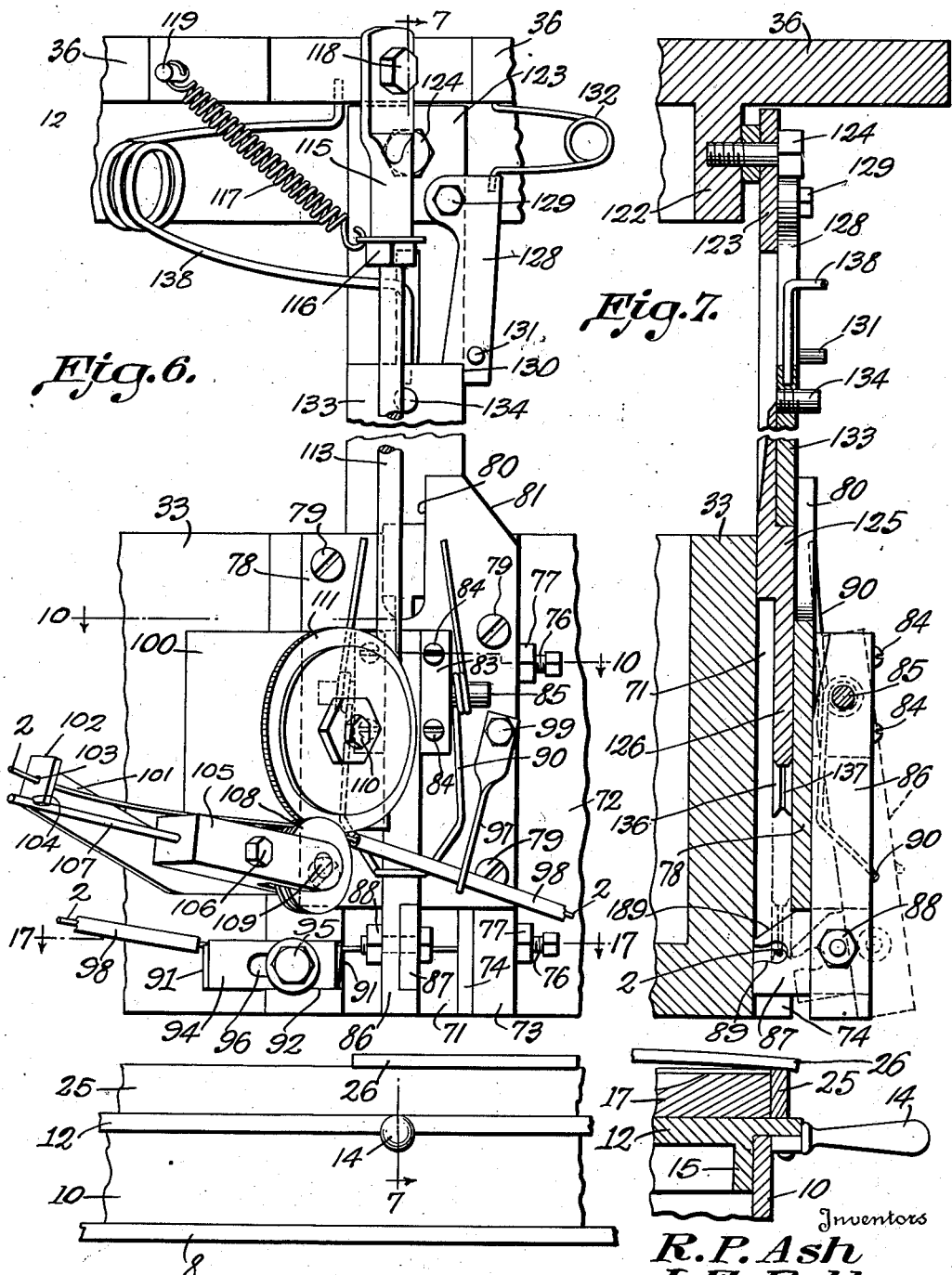
Inventors
R. P. Ash
J. E. Patty
By C. A. Snow & Co.
Attorneys.

Aug. 3, 1937.  R. P. ASH ET AL  2,088,563
STITCHING MACHINE
Filed June 26, 1936   8 Sheets-Sheet 7
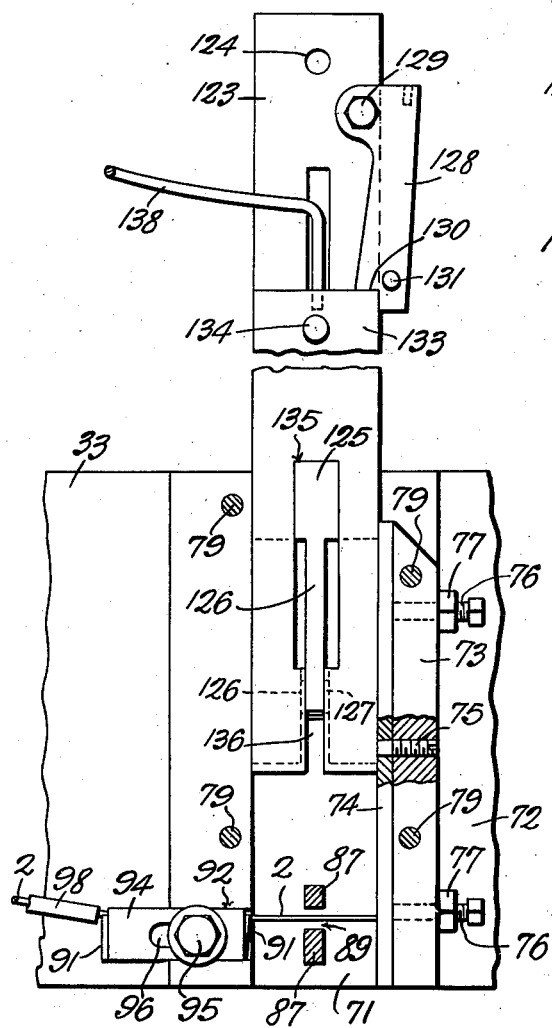
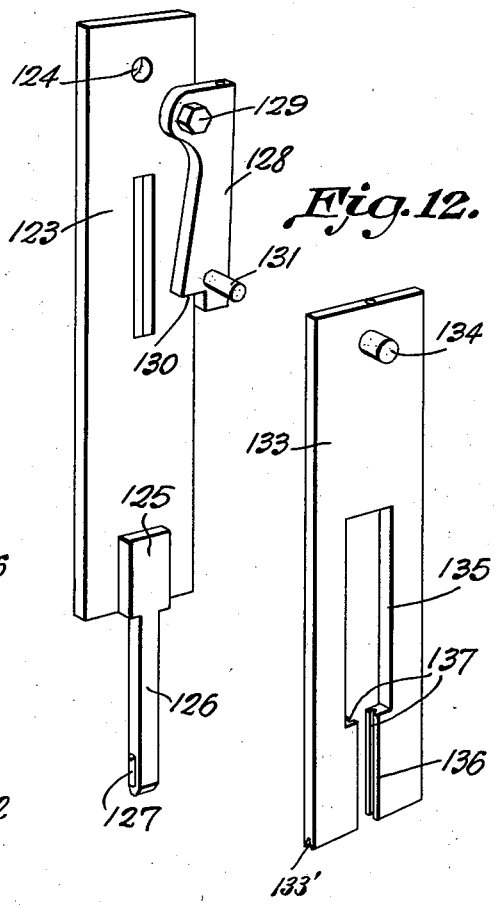
Inventors
R. P. Ash
J. E. Patty Aug. 3, 1937.　　R. P. ASH ET AL　　2,088,563
STITCHING MACHINE
Filed June 26, 1936　　8 Sheets-Sheet 8

Inventors
R. P. Ash
J. E. Patty
By C. A. Snow & Co.
Attorneys.

Patented Aug. 3, 1937

2,088,563

UNITED STATES PATENT OFFICE 2,088,563

STITCHING MACHINE

Rubin Pink Ash and Jesse Edgar Patty, Carthage, Tex.

Application June 26, 1936, Serial No. 87,576

7 Claims. (Cl. 1—13.6)

By way of explanation it may be stated that the cover of a basket generally is composed of a hoop and a plurality of superposed slats connected to the hoop by stapling or otherwise. Heretofore, many separate operations have been necessary to staple the slats to the hoop. One object of the present invention is to supply a machine whereby, with a single up and down reciprocation of a slide, all of the slats may be stapled to the hoop at once. A further object of the invention is to supply novel means for advancing the wire out of which the staple is formed. A further object of the invention is so to construct the machine that two operators, working alternately, can move the parts of the basket top or cover into position to be stapled, the output being increased accordingly. Another object of the invention is to supply novel means for putting a crown into the basket cover, should it be desired to do so. A further object of the invention is to supply novel means for holding the hoop and the slats of the basket cover on a carriage, so that they can be moved into the field of operation of the staple forming and staple driving means. Still another object of the invention is to provide novel means under the control of an operator for starting and stopping the machine.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 3 is a transverse section on the line 3—3 of Fig. 1;

Fig. 4 is a transverse section on the line 4—4 of Fig. 1;

Fig. 5 is a transverse section on the line 5—5 of Fig. 1;

Fig. 6 is an enlarged elevation disclosing one of the staple forming and staple driving mechanisms and attendant parts, portions being broken away;

Fig. 7 is a section on the line 7—7 of Fig. 6;

Fig. 9 is an elevation showing the staple forming and staple driving members, parts being removed, and parts appearing in section;

Fig. 10 is a transverse section on the line 10—10 of Fig. 6;

Fig. 11 is a perspective view of the member that drives the staple;

Fig. 12 is a perspective view illustrating the member that cuts off the wire out of which the staple is made and forms the staple;

Fig. 13 is an elevation showing the staple in process of formation, parts being in section;

Fig. 14 is an elevation showing the staple as it is being driven;

Fig. 17 is a section on the line 17—17 of Fig. 6;

Fig. 18 is a section on the line 18—18 of Fig. 17.

Figure 1:
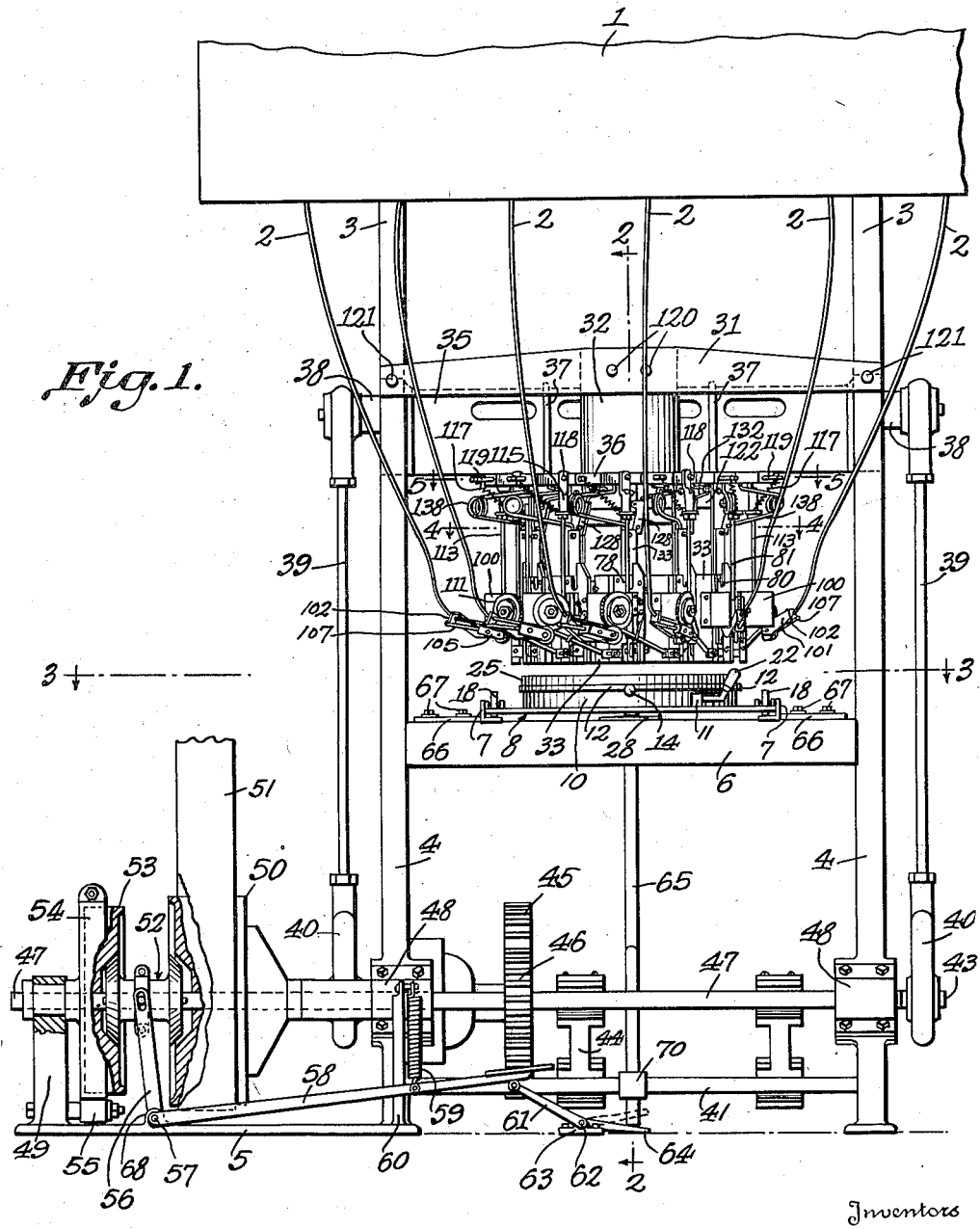
Fig. 1 shows in elevation, a machine constructed in accordance with the invention, parts being in section.
Figure 2:
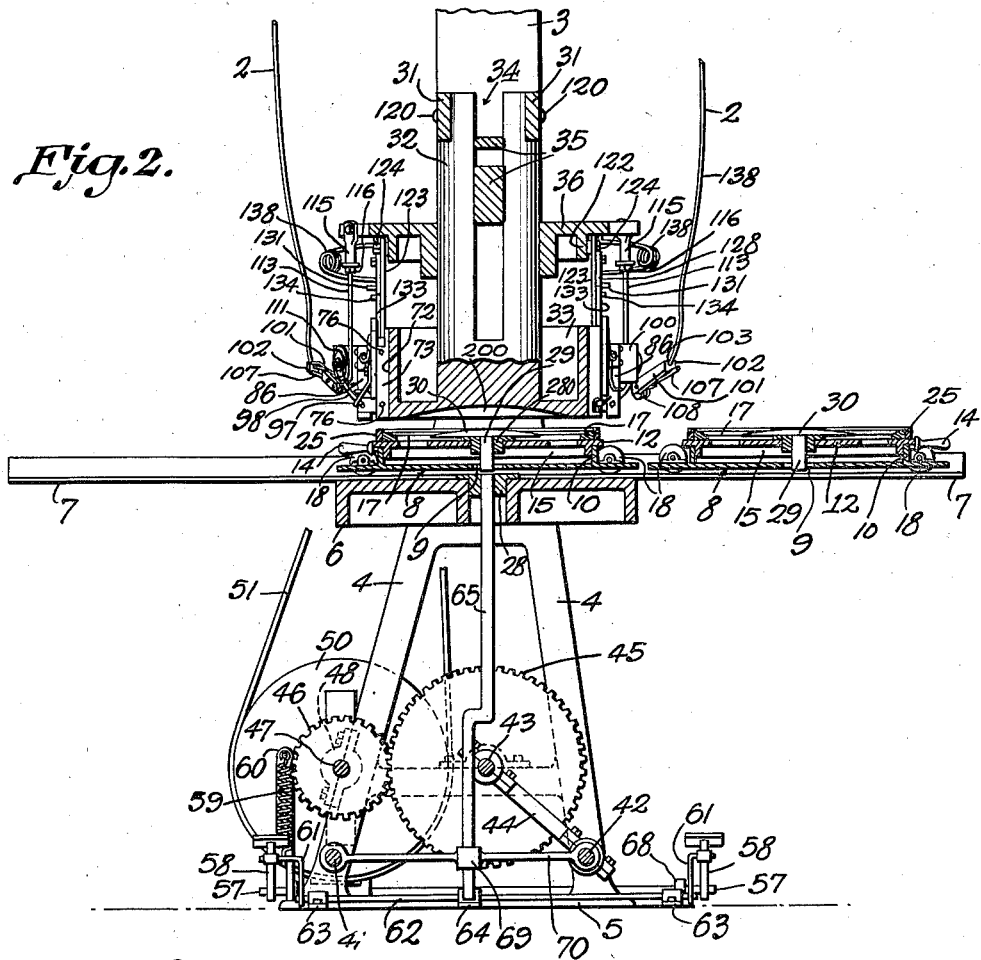
Fig. 2 is a vertical section on the line 2—2 of Fig. 1.

In Fig. 1 of the drawings, the numeral 1 marks a dispensing mechanism for the wires 2, out of which are formed the staples 150 (Fig. 14) that are driven through the slats 26 (Fig. 3) of the basket top, into the hoop 25 of the basket top. The dispensing mechanism 1 may be carried on the upper ends of standards 3 (Fig. 1) which form parts of the frame of the machine, the standards being provided at their lower ends with diverging legs 4 (Fig. 2). The legs 4 at one side of the machine are connected to the legs at the opposite side of the machine by rods 41 and 42 (Figs. 2 and 1). To the legs 4 of one standard, a laterally-extended base plate 5 is secured, as depicted in Figs. 1 and 3.

A horizontal platform 6 (Figs. 1, 2 and 3) is secured to the standards 3. Horizontal, parallel tracks 7 (Figs. 3, 2 and 1) are provided, the tracks having outstanding brackets 66 (Figs. 3 and 1), adjustably attached by securing elements 67 to the platform 6, to secure parallelism between the tracks and so to position carriages 8 which move along the tracks, that the carriages, the tables 12 on the carriages and the parts 25 and 26 of the basket tops on the tables, may be located beneath stapling mechanisms disposed in a circle, a statement which will be understood sufficiently for this point of the description if casual attention is given to Figs. 4 and 2. The platform 6 carries a central guide 28.

Figure 16:
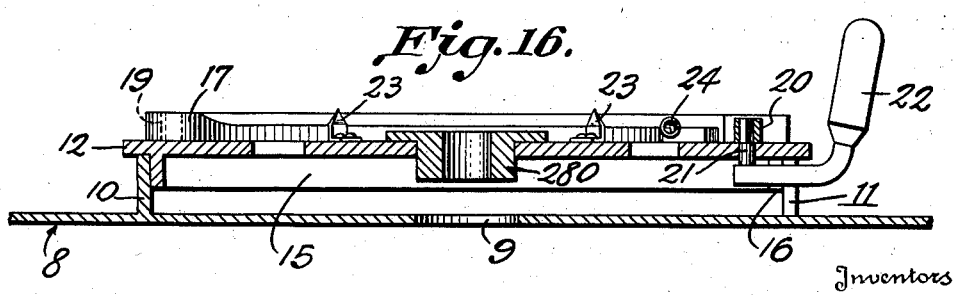
Fig. 16 is a section on the line 16—16 of Fig. 15.

The carriages 8 have wheels 18 engaging the tracks 7, to mount the carriages on the tracks for reciprocation toward and away from the vertical center of the machine by operators standing on opposite sides of it, an observation which will be understood readily when Fig. 2 of the drawings is noted. Figures 16 and 2 show that each carriage 8 has a central opening 9. Each carriage 8 is supplied with an upstanding collar 10 (Figs. 16 and 2). There is an opening 11 in the collar 10.

On each carriage-collar 10 rests a removable table 12 (Figs. 2, 15 and 16), the table being provided with an outstanding handle 14. The table 12 has a depending collar 15 that fits within the collar 10 on the carriage 8. The collar 15 of the table 12 is provided with an opening 16 (Fig. 16). The table 12 may be rotated by the outstanding handle 14 on the table, until the opening 16 of the table collar registers with the opening 11 in the collar 10 of the carriage 8. Arcuate hoop-holders 17 (Fig. 15) are mounted on the upper surface of the table 12. The hoop-holders 17 are pivoted at one end, as shown at 19, to the table 12. Between the free ends of the hoop-holders 17 works an expanding block 20 (Fig. 15), secured to the upper end of a vertical shaft 21 (Fig. 16) journaled in the table 12. The shaft 21 is operated by a handle 22 secured to the shaft, the handle passing outwardly through the opening 16 of the table-collar 15 and through the opening 11 of the carriage-collar 10. The table 12 is supplied with spaced, prong-like upstanding brackets 23, located within the hoop-holders 17. These brackets 23 aid in retaining in place on the table 12 and on the upper edge of the hoop 25, the mat portion of the basket cover, to wit, the slats 26 of Fig. 3.

Figure 15:
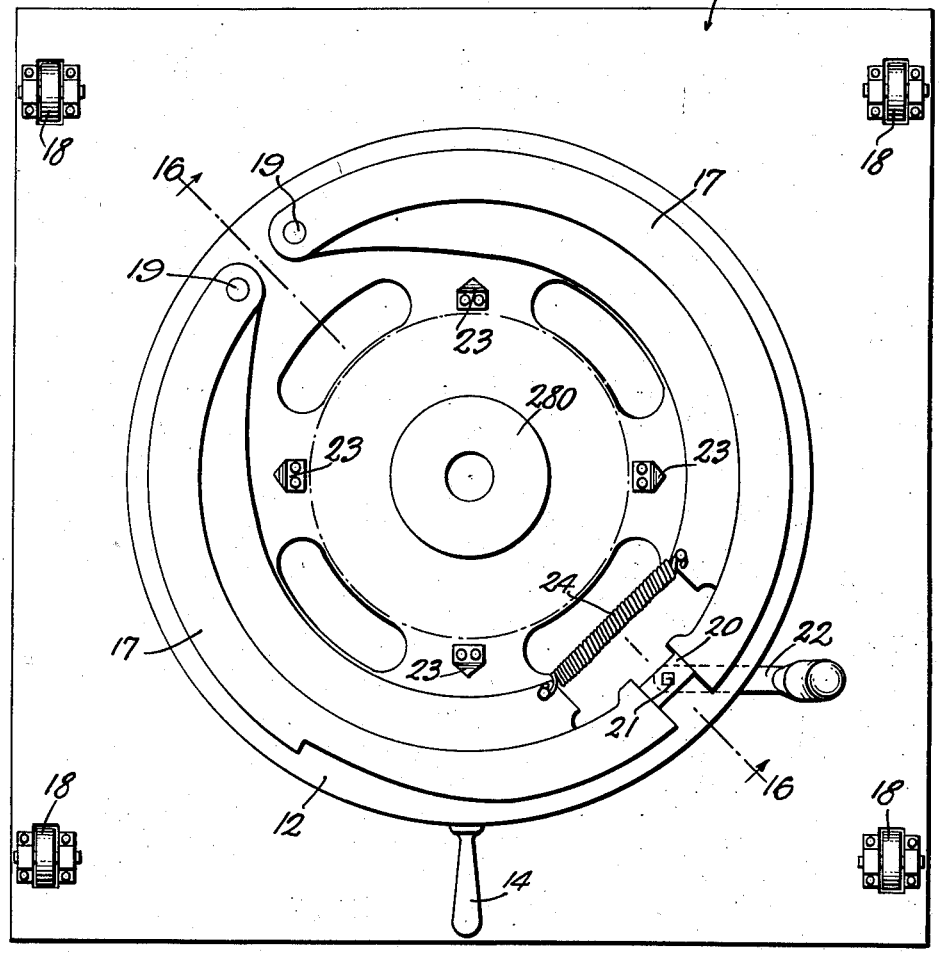
Fig. 15 is a plan showing the carriage and the table.

The free ends of the hoop-holders 17 (Fig. 15) are drawn toward each other by a retractile spring 24 that connects them. The hoop 25 that enters into the construction of the basket cover or top is not made in the machine forming the subject matter of this application, but is preformed. The hoop 25 is placed about the hoop-holders 17 (Figs. 2 and 15). The handle 23 is operated to rotate the shaft 21, and the block 20, operated between the free ends of the hoop holders 27 by the handle 22, expands the holders and causes them to grip the hoop 25 internally.

The machine forming the subject matter of this application functions to staple to the hoop 25, the mat shown in Fig. 3 and made up of a plurality of cross slats 26. The mat, like the hoop 25, is not made in the present machine, the constituent slats 26 of the mat being fastened together at 27, in any suitable way, before the machine herein described is put into operation, the mat being placed on top of the hoop 25, as in Figs. 3, 6, and 7.

In the center of the table 12 there is a guide 280 (Figs. 16 and 2), in which the stem 29 of a crowning block 30 fits slidably and removably, the stem 29 extending downwardly through the opening 9 of the carriage 8, the crowning block 30 resting on the upper portion of the guide 280.

Figures 1 and 2 disclose parallel bars 31 that have their ends secured at 121 to the standards 3 above the platform 6. A depending post 32 is attached at its upper end, as shown at 120 in Fig. 1, to the intermediate portions of the cross bars 31, and is supplied at its lower end with a cup-shaped foot 33 (Figs. 2 and 7). The post 32 has a longitudinal slot or guide 34 in its upper end. In the slot 34 of the post 32, a cross head 35 is mounted for vertical reciprocation. A disk-like slide 36 is mounted for vertical reciprocation on the post 32 and is secured at 37 (Fig. 5) to the lower edge of the cross head 35. The cross head 35 has reduced ends 38 (Fig. 1) which move vertically in the standards 3. To the ends 38 of the cross head 35, operating rods 39 are pivoted, the rods 39 being actuated by strap and eccentric mechanisms 40, carried by the ends of a horizontal shaft 43 journaled on the legs 4 and sustained by braces 44 (Figs. 2 and 1) secured to the rod 42 that connects the legs.

A gear wheel 45 (Figs. 2 and 1) is secured to the shaft 43 and meshes with a pinion 46, secured to a shaft 47 journaled in bearings 48 (Fig. 1) on the legs 4 of the framework of the machine, the shaft 47 being journaled also in a bearing 49 (Fig. 1) mounted on the base plate 5.

Any suitable means may be supplied for rotating the shaft 47. If desired, a pulley 50 may be mounted to rotate on the shaft 47, the pulley being driven by a belt 51. The pulley 50 is coupled to the shaft 47, at the will of an operator, by a clutch 52 (Fig. 1) splined to the shaft 47 and shiftable longitudinally of the shaft. The clutch 52 can cooperate with a brake disk 53, loose on the shaft 47, to couple the brake disk to the shaft. The brake disk 53 is engaged by a brake strap 54, attached at 55 to the bearing 49 on the base plate 5.

The clutch 52 is shifted by arms 56 (Figs. 1 and 3) secured to the intermediate portion of a shaft 57 journaled in bearings 68 on the base plate 5. Pedals 58 are secured to the ends of the shaft 57 at opposite sides of the machine, and are swung upwardly by a pull spring 59 (Figs. 1 and 2), connected to one of the pedals 58 and anchored at its upper end on a post 60 carried by the base plate 5. The spring 59 normally keeps the clutch 52 coupled to the brake disk 53, as shown in Fig. 1, the shaft 47 thus being held against rotation.

The pedals 58 extend inwardly toward the central vertical plane of the machine, as shown in Figs. 1 and 3 and are disposed on opposite sides of the framework, as shown in Fig. 2, thereby to enable two operators to work alternately. Underneath the inner ends of the pedals 58 ride roller-carrying cranks 61 (Fig. 1) on the ends of a shaft 62 (Fig. 2), the said shaft being journaled in fixedly supported bearings 63. Intermediate its ends, the shaft 62 is provided with an arm 64 (Figs. 2 and 1) adapted to engage with the lower end of a vertical slide rod 65. The slide rod 65 is adapted to engage the stem 29 of the crowning block 30 (Fig. 2). The slide rod 65 has vertical reciprocation in the bearing 28 on the platform 6 (Figs. 2 and 16). The lower portion of the slide rod 65 reciprocates in a bearing 69 (Figs. 1 and 2), carried by a support 70, mounted at its ends on the frame rods 41 and 42.

Around the periphery of the vertically movable slide 36 and around the periphery of the fixed foot 33 on the post 32 (Figs. 5 and 4) are located a plurality of staple-forming and staple-driving mechanisms, there being preferably twelve of these mechanisms, although a greater or less number may be employed. Since the said mechanisms are duplicates, but one of them will be described in detail.

Referring to Figs. 9, 10 and 7, it will be observed that the fixed foot 33 has a vertical external guideway 71, and a circumferentially-inclined surface 72 (Fig. 17) at one side of the guideway, said surface forming a vertical rib 73 which bounds the guideway 71 at one side. A gib strip 74 (Figs. 9 and 10) is disposed against the inner surface of the rib 73. The gib strip 74 has transverse adjustment, to take up wear, on a supporting pin 75, threaded into the rib 73. The gib strip 74 is adjusted transversely by screws 76 threaded into the rib 73 and held in adjusted positions by lock nuts 77.

A cover plate 78 (Figs. 6, 7 and 10) is attached to the outer surface of the foot 33 and to the rib 73 by securing elements 79 and bridges the guideway 71. The cover plate 78 has a notch 80 in its end with an opening 89, the finger having a bevplate the same is provided with a cam surface 81 (Fig. 6). The cover plate 78 terminates short of the lower end of the guideway 71 (Fig. 6) and therefore the guideway is outwardly open at its lower end (Fig. 7). There are outstanding brackets 82 (Fig. 10) on the cover plate 78, and cap pieces 83 (Fig. 6) are held on the brackets by securing elements 84. The cap pieces 83 retain a transverse pivot element 85 on the brackets 82.

A radius arm 86 (Figs. 6 and 7) is mounted to swing in a vertical plane on the pivot element 85, between the brackets 82. An inwardly-extended looping finger 87 is secured at 88 to the lower end of the radius arm 86, and is provided at its inner end with an opening 89, the finger having a beveled upper edge 189. A U-shaped spring 90 is engaged around the ends of the pivot element 85 (Fig. 6), the upper end of the spring having a bearing against the cover plate 78, and the lower part of the spring having a bearing against the outer edge of the radius arm 86, below the pivot element 85. The tendency of the spring 90 is to swing the radius arm 86 inwardly, until the end of the looping finger 87 bears against the foot 33, at the base of the guideway 71, as shown in Fig. 7.

A shearing bar 91, (Figs. 6, 9, 13, 14, 17 and 18) is mounted in a transverse seat 92 (Figs. 18 and 17) formed in the foot 33, and the working end of the shearing bar is disposed at one side of the guideway 71, as shown, for instance, in Fig. 9. The shearing bar 91 has a groove 93 (Fig. 18) in its upper edge. The groove 93 is covered by the horizontal wing of an angular housing plate 94, the vertical depending wing of the housing plate overlapping the outer surface of the shearing bar 91. A securing device 95, such as a screw threaded into the foot 33, holds the shearing bar 91 and the housing plate 94 in place, but these elements are slotted longitudinally as at 96 (Fig. 6) to receive the securing device 95, the object in view being to permit a longitudinal adjustment of the shearing bar, so that its working end is positioned properly with respect to the guideway 71.

Figure 6 shows that a retainer 97 is secured at 99 to the cover plate 78. The part 97 is called a retainer because it holds a tubular guide 98, through which passes the wire 2 that is to be formed into the staple 150 of Fig. 14. Here note that the guide 98 does not direct the wire 2 to the particular staple-forming mechanism on which the guide 98 is held by the retainer 97, but to the next-adjoining staple-forming mechanism, a remark which will be understood when Fig. 6 is noted. The guide 98 directs the wire 2 into the groove 93 of the shearing bar 91.

A mechanism is provided for feeding the wire 2 through the guide 98 and through the groove 93 of the shearing bar 91 until the wire 2 crosses the guideway 71 (Figs. 9 and 17) and abuts against the gib 74, the wire extending through the opening 89 of the looping finger 87 on the radius arm 86 (Figs. 7 and 17). The feeding device does not advance the wire with respect to the particular staple-forming mechanism on which the feeding device is mounted, but to the next-adjoining staple-forming mechanism. In that connection, refer to Fig. 1 for a general disclosure, and to Fig. 6 for a more detailed disclosure on a larger scale.

The mechanism that feeds the wire 2 into the position shown in Fig. 17 will now be described. A V-shaped bracket 100 (Fig. 4) is secured to the inclined surface 72 of the foot 33. This bracket 100 has an outstanding part 101 (Fig. 6), provided at its outer end with an offset extension 102 in which a hole 103 is formed. There is a notch or seat 104 in the lower edge of the extension 102. A slotted lever 105 is fulcrumed intermediate its ends, as shown at 106, on the outer arm of the bracket 100. At one end, the lever 105 carries a spring finger 107 which is engaged in the seat 104 of the extension 102 of the part 101 of the bracket 100. A grooved wheel 108 is journaled at 109 in the slot in the inner end of the lever 105. A stub shaft 110 is mounted on the bracket 100. A feed wheel 111 is journaled on the stub shaft 110, and the periphery of the feed wheel 111 is received in the grooved periphery of the wheel 108. The wire 2 passes through the hole 103 of the bracket part 102 (Fig. 6) and through the groove of the wheel 108, underneath the feed wheel 111, into the tubular guide 98. The spring finger 107 on the lever 105 serves to tilt the lever on its fulcrum 106 and press the wire 2 against the periphery of the feed wheel 111. It is obvious that if rotation is imparted to the feed wheel 111, the wire 2 will be advanced.

Figure 8:
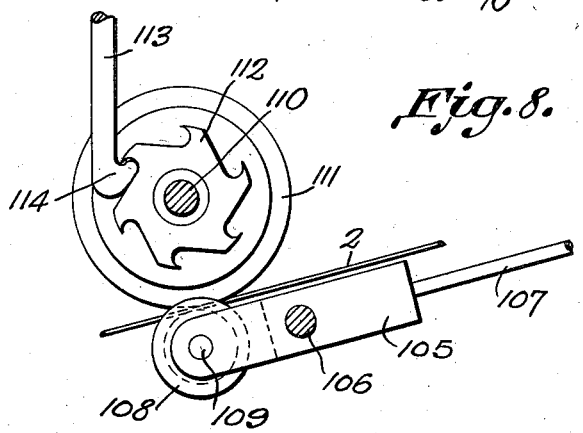
Fig. 8 is an elevation showing the mechanism for feeding the wire to the staple forming means, parts being in section.

The means for imparting rotation to the feed wheel 111 embodies a ratchet wheel 112 (Fig. 8) connected to the feed wheel 111 to rotate therewith. Rotation is imparted to the ratchet wheel 112, and consequently to the feed wheel 111, by a vertically-movable pawl 113 (Fig. 6), provided at its lower end (Fig. 8) with a hook 114, adapted to cooperate with the ratchet wheel 112. The upper end of the pawl 113 (Fig. 6) is threaded into a socket 115, to the end that the effective length of the pawl 113 may be varied. A lock nut 116 holds the pawl 113 in any position to which it may have been adjusted longitudinally in the socket 115. A pull spring 117 is connected to the socket 115 and to an outstanding pin 119 on the edge of the vertically-movable slide 36. The upper end of the socket 115 is pivoted at 118 to the slide 36. Figure 5 shows that, as to general peripheral contour, the slide 36 resembles the foot 33 of Fig. 4.

The function of the spring 117 is to swing the pawl 113 laterally and to keep the hook end 114 (Fig. 8) of the pawl yieldably engaged with the ratchet wheel 112 that actuates the feed wheel 111. If the slide 36 be moved up and down, the pawl 113 will participate in that movement, rotation will be transmitted to the feed wheel 111 by way of the ratchet wheel 112, and the wire 2 will be advanced through the groove 93 of the shearing bar 91 and through the guide 98.

The slide 36 has a depending flange 122, shown in Figs. 6 and 7, to which a staple driver 123, detailed in Fig. 11, is attached at 124. The staple driver 123 is provided at its lower end with an outwardly offset guide block 125 having a reduced depending tongue 126. The tongue 126 has laterally extended ribs 127. A dog 128 (Fig. 6) is pivoted at 129 to the driver 123, at a point near the upper end of the driver, the dog being supplied at its lower end with a seat 130. Near to the seat 130, the dog 128 has an outstanding projection 131 which is adapted to cooperate with the cam surface 81 of the cover plate 78 (Fig. 6). The dog 128 is retained yieldably in the position of Fig. 6 by a spring 132, attached to the slide 36 and to the upper end of the dog. The staple driver 123 and the staple former 133 (next to be described) have vertical reciprocating movement in the guideway 71, behind the cover plate 78 (Fig. 7).

The staple former 133 is located in front of the driver 123, in slidable contact therewith. The former 133 (Fig. 12) has a groove 133' in its lower end and is provided near its upper end with an outstanding stop projection 134, adapted to enter the notch 88 of the cover plate 78 (Fig. 6). The former 133 is provided with a guide opening 135, in which the block 125 on the driver 123 can work vertically. The tongue 126 on the driver 123 is adapted to work in a slot 136 fashioned in the lower end of the staple former 133, the member 133 being provided with guide grooves 137, located on opposite sides of the slot 136 and adapted to receive the ribs 127 on the tongue 126 of the driver 123. Under the impulse of the spring 132 of Fig. 6, the seat 130 of the dog 128 is held engaged with one corner of the former 133. The slot 136 of the staple former 133 is adapted to receive the looping finger 87 of the radius arm 86 (Fig. 7) whilst the staple 150 is being formed as in Fig. 13. The upper end of a spring 138 (Fig. 6) is secured to the slide 36, the lower end of the spring being attached to the upper end of the staple former 133.

The machine can be operated from opposite sides thereof by two men, working alternately, there being two of the carriages 8 (Fig. 2) and two of the pedals 58 and associated parts, the output of the machine being increased accordingly. With that observation, the description of the operation will proceed as though the machine were being handled by one operator.

The operator places the hoop 25 on the table 12, about the hoop holders 17 of Fig. 15, the holders being opened to grip the hoop, by means of the handle 22, the shaft 21 and the expanding block 20. The mat, made up of the slots 26 (Fig. 3) connected as shown at 27, is placed on top of the hoop 25 and is retained by the prongs 23. The table 12 is mounted on the carriage 8 (Fig. 16), the collar 15 on the table fitting within the collar 10 on the carriage.

The parts 25 and 26 of the basket top now are in position on the table 12, as shown in Fig. 3, the table 12 being assembled with the carriage 8. The carriage 8 may be assumed to be in the position occupied by the carriage at the right hand side of Fig. 2. The carriage 8 is advanced under the stapling mechanisms, on the track 7, into the position occupied by the centrally disposed or left hand carriage in Fig. 2.

The operator steps on the pedal 58 of Figs. 1 and 3, rotation is imparted to the shaft 57, and the arms 56 on the shaft withdraw the clutch 52 from the brake mechanism 53—54, the clutch coupling the pulley 50 to the shaft 47, the shaft being rotated from the belt 51. The pinion 46 (Fig. 2) on the shaft 47 drives the gear wheel 45 and rotates the shaft 43. The strap and eccentric mechanisms 40 on the shaft 43 impart movement to the operating rods 39 of Fig. 1, and the cross head 35 is moved downwardly, the cross head carrying downwardly and then upwardly the slide 36 which is attached to it.

After the staple forming and staple driving steps (hereinafter described) have been completed, the operator takes his foot off the pedal 58, and the spring 59 of Fig. 1 slides the clutch 52 out of engagement with the driving pulley 50 and into engagement with the brake mechanism 53—54, the operation of the machine being stopped at the end of the upward stroke of the cross head 35 and the slide 36.

As the cross head 35 and the slide 36 move upwardly, after the staple forming and staple driving steps have been carried out, as hereinafter described, the pawl 113 of Fig. 6 is carried upwardly, and the hook 114 (Fig. 8) of the pawl 113 turns the ratchet wheel 112, rotation being imparted to the feed wheel 111. The feed wheel 111 (Fig. 6), cooperating with the grooved wheel 108 on the lever 105, advances the wire through the guide 98 on one staple forming mechanism, through the groove 93 of the shearing bar 91 (Figs. 18 and 17) and through the opening 89 (Fig. 17) in the finger 87 of the radius arm 86 (Fig. 7) until the end of the wire is against the gib strip 74, as in Fig. 17.

When the slide 36 moves downwardly, the driver 123 moves downwardly, because the driver is connected to the slide at 124. The former 133 moves downwardly, also, since the dog 128 is engaged with the former, as in Fig. 9. The former 133, however, operates below the driver 123 (Figs. 7 and 9). The looping finger 87 of the radius arm 86 (Fig. 7) extends into the guideway 71, under the impulse of the spring 90.

As the driver 123 and the former 133 move downwardly together, in the position of Fig. 9, the former 133 straddles the finger 87 of the radius arm 86, the finger of the radius arm being received in the slot 136 of the former 133. The former 133 cooperates with the inner end of the shearing bar 91 (Fig. 6), to cut off the length of wire that is to be formed into the staple 150. As the former 133 moves downwardly, with the severed length of wire in the groove 133', the former bends the severed piece of wire across the finger 87 of the radius arm 86, as in Fig. 13, to form the staple. The side arms of the completed staple 150 are received in the grooves 137 (Figs. 12 and 14) of the former 133.

As the driver 123 and the former 133 move downwardly together, a time arrives when the projection 131 on the dog 128 engages the cam surface 81 (Fig. 6) of the fixed cover plate 78, the dog 128 being freed from the former 133. The former 133 is projected conventionally below the foot 33 (Fig. 14), due to the force of the spring 138, and held down yieldably by the action of the spring 138, but the driver 123 moves downwardly with respect to the former, because the driver is attached positively to the slide 36 at 124. As the driver 123 moves downwardly, the lower end of the tongue 126 of the driver engages the beveled edge 189 of the finger 87 on the radius arm 86 and swings the radius arm outwardly to the dotted line position of Fig. 7, the finger 87 on the radius arm being withdrawn from the completed staple 150. The driver 123 continues to move downwardly, and the tongue 126 of the driver 123 (Fig. 14) ejects the completed staple 150 out of the grooves 137 of the former 133 and drives the staple through the slats 26 (Fig. 3) of the basket top, into the hoop 25 of the basket top, the former being in the lowered position of Fig. 14, so as to guide the staple directly into the work. Since there are twelve of the staple forming and staple driving mechanisms, arranged around the periphery of the foot 33, as shown in Fig. 4, all of the slats 26 are stapled at each end, in a single operation, to the hoop 25, the output of the machine being increased accordingly.

On the upstroke of the slide 36, the tendency of the spring 138 is to hold down the former 133, and make it lag behind the driver 123. This affords an interval of time during which the dog 128 can swing inwardly under the action of the spring 132, to the position of Fig. 9, wherein it again engages the upper end of the driver 123, the block 125 on the driver 123 ultimately arriving at the upper end of the opening 135 in the former 133, as in Fig. 9, the former 133 being raised positively, along with the driver 123. When the driver 123 is raised, the tongue 126 thereof is withdrawn from engagement with the inner end of the radius arm 87 (Fig. 7) of the radius arm 86, and the radius arm then swings inwardly, to the position of Fig. 7, under the urge of the spring 90.

When the slide rod 65 (Fig. 2) is raised by a train of parts comprising the arm 64, the shaft 62, the arm 61 and the pedal 58, the slide rod engages the stem 29 of the crowning block 30 and raises the crowning block. The fixed foot 33 has a concavity 200 (Figs. 2 and 16) in its lower end, conforming to the convexity of the crowning block 30. The upward movement of the crowning block 30 puts a curve into the slats 26, as shown in Fig. 16, when an upwardly dished basket cover is desired. If a flat cover is called for, as in Fig. 15, the crowning block 30 simply is removed from the bearing 280 of the table 12, and when the machine is operated there is no upward flexing of the basket cover.

Having thus described the invention, what is claimed is:

1. In a machine for stapling a mat to a hoop, to form a basket cover, a frame, a fixed foot carried by the frame, a plurality of staple formers and drivers mounted on the foot and located in conformity to the shape of the hoop, a slide, means for mounting the slide for reciprocation on the frame, toward and away from the foot, means for reciprocating the slide, means connected to the slide for actuating all of the formers and drivers at once, responsive to one movement of the slide, a track mounted on the frame, a carriage mounted to move along the track, into and out of the field of operation of the formers and drivers, a table detachably assembled with the carriage, hoop retaining means on the table, a crowning block mounted on the table for movement toward and away from the foot, and means for moving the crowning block toward and away from the foot.

2. In a machine for stapling a mat to a hoop, to form a basket cover, a frame, a fixed foot carried by the frame, a plurality of staple formers and drivers mounted on the foot and located in conformity to the shape of the hoop, a slide, means for mounting the slide for reciprocation on the frame, toward and away from the foot, means for reciprocating the slide, means connected to the slide for actuating all of the formers and drivers at once, responsive to one movement of the slide, a track mounted on the frame, a carriage mounted to move along the track, into and out of the field of operation of the formers and drivers, a table detachably assembled with the carriage, hoop retaining means on the table, a crowning block mounted on the table for movement toward and away from the foot, mechanism under the control of an operator for starting and stopping the means for reciprocating the slide, and means actuated by said mechanism for moving the crowning block toward and away from the foot.

3. In a machine for stapling a mat to a hoop, to form a basket cover, a frame, a fixed foot carried by the frame, a slide mounted on the frame for reciprocation toward and away from the foot, means for holding a hoop and a mat on the frame, a crowning block movable on said means, toward and away from the foot, mechanism for reciprocating the slide, including a shaft journaled on the frame, a driving member loose on the shaft, a clutch connecting the driving member with the shaft, a pedal operatively connected with the clutch and fulcrumed on the frame, the pedal being under the control of an operator, a member mounted to reciprocate on the frame and cooperating with the crowning block to move the crowning block toward and away from the foot, a second shaft supported for rocking movement and having arms, one of which is actuated by the pedal, the other of which actuates said member, a plurality of staple formers and drivers mounted on the foot and located in conformity to the shape of the hoop, and means connected to the slide for actuating all of the formers and drivers at once, responsive to one movement of the slide.

4. In a machine for stapling a mat to a hoop, to form a basket cover, a frame, a fixed foot carried by the frame and conforming to the shape of the hoop, a plurality of staple formers and drivers mounted on the foot and located in conformity to the shape of the hoop, a slide conforming to the shape of the foot and the hoop, means for mounting the slide for reciprocation on the frame, toward and away from the foot, means for reciprocating the slide, means connected to the slide for actuating all of the formers and drivers at once, responsive to one movement of the slide, a track mounted on the frame, a carriage mounted to move along the track, into and out of the field of operation of the formers and drivers, a table supported removably on the carriage, hoop-retaining means on the table, the carriage and the table having releasably interengaged parts which maintain the table and the hoop-retaining means in such position relatively to the carriage that when the carriage is advanced beneath the foot, the hoop will be positioned in the field of operation of the formers and drivers, and means carried by the table for holding a mat against lateral movement on the hoop whilst the carriage is being moved into the field of operation of the drivers and formers, thereby to assure a proper relation between the mat and the hoop when they arrive in the field of operation of the formers and drivers.

5. A machine for stapling a mat to a hoop, constructed as set forth in claim 4, and wherein the last specified means comprises upstanding prongs on the table, over which the mat may be shifted laterally to secure a proper positioning of the mat with respect to the hoop, and whereon the mat may be impaled and held, after the aforesaid positioning of the mat has been completed.

6. In a machine for stapling a mat to a hoop, to form a basket cover, a frame, a fixed foot carried by the frame and conforming to the shape of the hoop, a plurality of staple formers and drivers mounted on the foot and located in conformity to the shape of the hoop, a slide conforming to the shape of the foot and the hoop, means for mounting the slide for reciprocation on the frame, toward and away from the foot, means connected to the slide for actuating all of the formers and drivers at once, responsive to one movement of the slide, a track mounted on the frame and having end portions extended beyond opposite sides of the frame, carriages mounted to move on the track, alternately, into and out of the field of operation of the formers and drivers, under the actuation of operators positioned on opposite sides of the frame, hoop-holding means on the carriages, mechanism for reciprocating the slide, said mechanism comprising clutch means normally holding it inactive, and devices under the control of operators for releasing the clutch means and rendering said mechanism active, said devices being located on opposite sides of the frame and so closely adjacent to the end portions of the track that either operator, positioned as specified, may start and stop the machine whilst he remains so placed as to reciprocate one of the carriages.

7. In a machine for stapling a mat to a hoop, to form a basket cover, a frame comprising standards, a platform connecting the standards, means for mounting a hoop and a mat on the platform, a cross member connecting the standards, above the platform, a fixed post depending from the intermediate portion of the cross member and provided at its lower end with a fixed foot conforming in outline to the hoop, the post being supplied with a vertically elongated guide, a cross head having its ends mounted for reciprocation in the standards, toward and away from the foot, a slide connected to the cross head and conforming in outline to the hoop and the foot, the slide being mounted to reciprocate on the post, means connected to the cross head for reciprocating the cross head and the slide, toward and away from the foot, a plurality of staple formers and drivers mounted on the foot and located in conformity to the shape of the hoop and the slide, and means connected to the slide for actuating all of the formers and drivers at once, responsive to one movement of the slide, the cross head being engaged slidably intermediate its ends with the guide, to secure right line reciprocation of the slide and the cross head, toward and away from the foot, independently of the slidable mounting of the ends of the cross head in the standards.

RUBIN PINK ASH.
JESSE EDGAR PATTY.